US012430925B2

United States Patent
Choi

(10) Patent No.: US 12,430,925 B2
(45) Date of Patent: Sep. 30, 2025

(54) VEHICLE CONTROL SYSTEM AND VEHICLE DRIVING METHOD USING THE VEHICLE CONTROL SYSTEM

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 426 days.

(21) Appl. No.: 17/878,357

(22) Filed: Aug. 1, 2022

(65) Prior Publication Data
US 2023/0154196 A1    May 18, 2023

(30) Foreign Application Priority Data
Nov. 16, 2021    (KR) .......................... 10-2021-0158001

(51) Int. Cl.
*G06V 20/58* (2022.01)
*B60W 30/09* (2012.01)
(Continued)

(52) U.S. Cl.
CPC ............. *G06V 20/58* (2022.01); *B60W 30/09* (2013.01); *B60W 30/0956* (2013.01);
(Continued)

(58) Field of Classification Search
CPC ...... G06V 20/58; G06V 20/56; G06V 20/584; B60W 30/09; B60W 30/0956; B60W 30/16; B60W 30/18163; B60W 40/04; B60W 50/14; B60W 2050/143; B60W 2050/146; B60W 2420/403; B60W 2554/802; B60W 60/00; B60W 40/02; B60W 40/10; B60W 50/08; B60W 60/001; B60W 60/0053; B60W 2050/0005; B60W 2050/007; B60W 2554/4043

See application file for complete search history.

(56) References Cited

U.S. PATENT DOCUMENTS

2020/0257294 A1* 8/2020 Ishioka ................ G05D 1/0088
2021/0070288 A1* 3/2021 Yamaoka ............. G06V 20/588

OTHER PUBLICATIONS

Gonner, Steffen, et al. "Vehicle recognition and TTC estimation at night based on spotlight pairing." 2009 12th International IEEE Conference on Intelligent Transportation Systems. IEEE, 2009. (Year: 2009).*

* cited by examiner

*Primary Examiner* — Ramya P Burgess
*Assistant Examiner* — Ana D Thomas
(74) *Attorney, Agent, or Firm* — NSIP Law

(57) ABSTRACT

A vehicle control system includes a processor that processes data related to driving of a vehicle, an imaging device to sense and image an external environment, and a vehicle controller. The processor recognizes a preceding vehicle using a plurality of cameras included in the imaging device, predicts an angle at which the preceding vehicle is oriented toward a subject line based on a difference between image information obtained from the plurality of cameras, calculates a speed of the preceding vehicle in a transverse direction based on the angle, calculates a biased driving factor based on a time remaining until the vehicle meets the preceding vehicle in a longitudinal direction and the speed of the preceding vehicle in the transverse direction, and controls the vehicle controller based on the biased driving factor.

12 Claims, 13 Drawing Sheets

(51) Int. Cl.
  *B60W 30/095* (2012.01)
  *B60W 30/16* (2020.01)
  *B60W 30/18* (2012.01)
  *B60W 40/04* (2006.01)
  *B60W 50/14* (2020.01)

(52) U.S. Cl.
  CPC ...... *B60W 30/16* (2013.01); *B60W 30/18163* (2013.01); *B60W 40/04* (2013.01); *B60W 50/14* (2013.01); *B60W 2050/143* (2013.01); *B60W 2050/146* (2013.01); *B60W 2420/403* (2013.01); *B60W 2554/802* (2020.02)

VEHICLE CONTROL SYSTEM AND VEHICLE DRIVING METHOD USING THE VEHICLE CONTROL SYSTEM

CROSS-REFERENCE TO RELATED APPLICATION

This application claims the benefit of priority to Korean Patent Application No. 10-2021-0158001, filed in the Korean Intellectual Property Office on Nov. 16, 2021, the entire contents of which are incorporated herein by reference.

TECHNICAL FIELD

The present disclosure relates to a vehicle control system and a vehicle driving method using the vehicle control system, and more particularly, to an autonomous driving technology that improves accuracy of a target travel route.

BACKGROUND

Autonomous driving technology in which a travel route of a vehicle is set and the vehicle travels according to the set travel route while the driver does not drive the vehicle directly is emerging. Autonomous driving technology may be implemented in a scheme of acquiring route information on the travel route, setting the travel route based on the obtained route information, and driving the vehicle according to the set route.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

According to the existing autonomous driving technology, it may not be easy to set an accurate travel route for various situations.

The present disclosure has been made to solve the above-mentioned problems occurring in the prior art while advantages achieved by the prior art are maintained intact.

An aspect of the present disclosure provides a technique for setting an accurate travel route for various situations.

The technical problems to be solved by the present disclosure are not limited to the aforementioned problems, and any other technical problems not mentioned herein will be clearly understood from the following description by those skilled in the art to which the present disclosure pertains.

In one general aspect, a vehicle control system includes a processor configured to process data related to driving of a vehicle, an imaging device configured to sense and image an external environment, and a vehicle controller configured to control the driving of the vehicle. The processor is configured to recognize a preceding vehicle using a plurality of cameras included in the imaging device, predict an angle at which the preceding vehicle is oriented toward a subject line based on a difference between image information obtained from the plurality of cameras, calculate a speed of the preceding vehicle in a transverse direction based on the angle, calculate a biased driving factor based on a time remaining until the vehicle meets the preceding vehicle in a longitudinal direction and the speed of the preceding vehicle in the transverse direction, and control the vehicle controller based on the biased driving factor.

The system may include an input device configured to receive a user input for controlling a driving function of the vehicle; a sensing device configured to acquire the data related to driving of the vehicle from the vehicle and the external environment; and an output device configured to provide information related to the driving of the vehicle.

The processor may be configured to initiate biased driving control of the vehicle controller such that the vehicle drives in a biased manner toward a line opposite to the subject line, based on the biased driving factor.

The processor may be configured to calculate a heading angle between the preceding vehicle and the vehicle, based on the difference between the image information obtained from the plurality of cameras.

The processor may be configured to calculate the biased driving factor by dividing the time remaining until the vehicle meets the preceding vehicle in the longitudinal direction by the speed of the preceding vehicle in the transverse direction.

The processor may be configured to determine whether the preceding vehicle cuts-in in front of the vehicle and to control the vehicle controller such that the vehicle drives in a biased manner to a side opposite to the preceding vehicle invading a control point in the transverse direction.

Each of the cameras may be mounted at a different position of the vehicle.

In another general aspect, a method for driving a vehicle using a vehicle control system includes recognizing a preceding vehicle using a plurality of cameras included in an imaging device of the vehicle, predicting an angle at which the preceding vehicle is oriented toward a subject line based on a difference between image information obtained from the plurality of cameras, calculating a speed of the preceding vehicle in a transverse direction based on the angle, calculating a biased driving factor based on a time remaining until the vehicle meets the preceding vehicle in a longitudinal direction and the speed of the preceding vehicle in the transverse direction, and controlling a vehicle controller based on the biased driving factor.

Controlling the vehicle controller may include initiating biased driving control of the vehicle controller such that the vehicle drives in a biased manner toward a line opposite to the subject line, based on the biased driving factor.

Predicting the angle at which the preceding vehicle is oriented toward the subject line may include calculating a heading angle between the preceding vehicle and the vehicle, based on the difference between the image information obtained from the plurality of cameras.

Calculating the biased driving factor may include dividing the time remaining until the vehicle meets the preceding vehicle in the longitudinal direction by the speed of the preceding vehicle in the transverse direction.

Controlling the vehicle controller may include: determining whether the preceding vehicle cuts-in in front of the vehicle; and controlling the vehicle controller such that the vehicle drives in a biased manner to a side opposite to the preceding vehicle invading a control point in the transverse direction.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
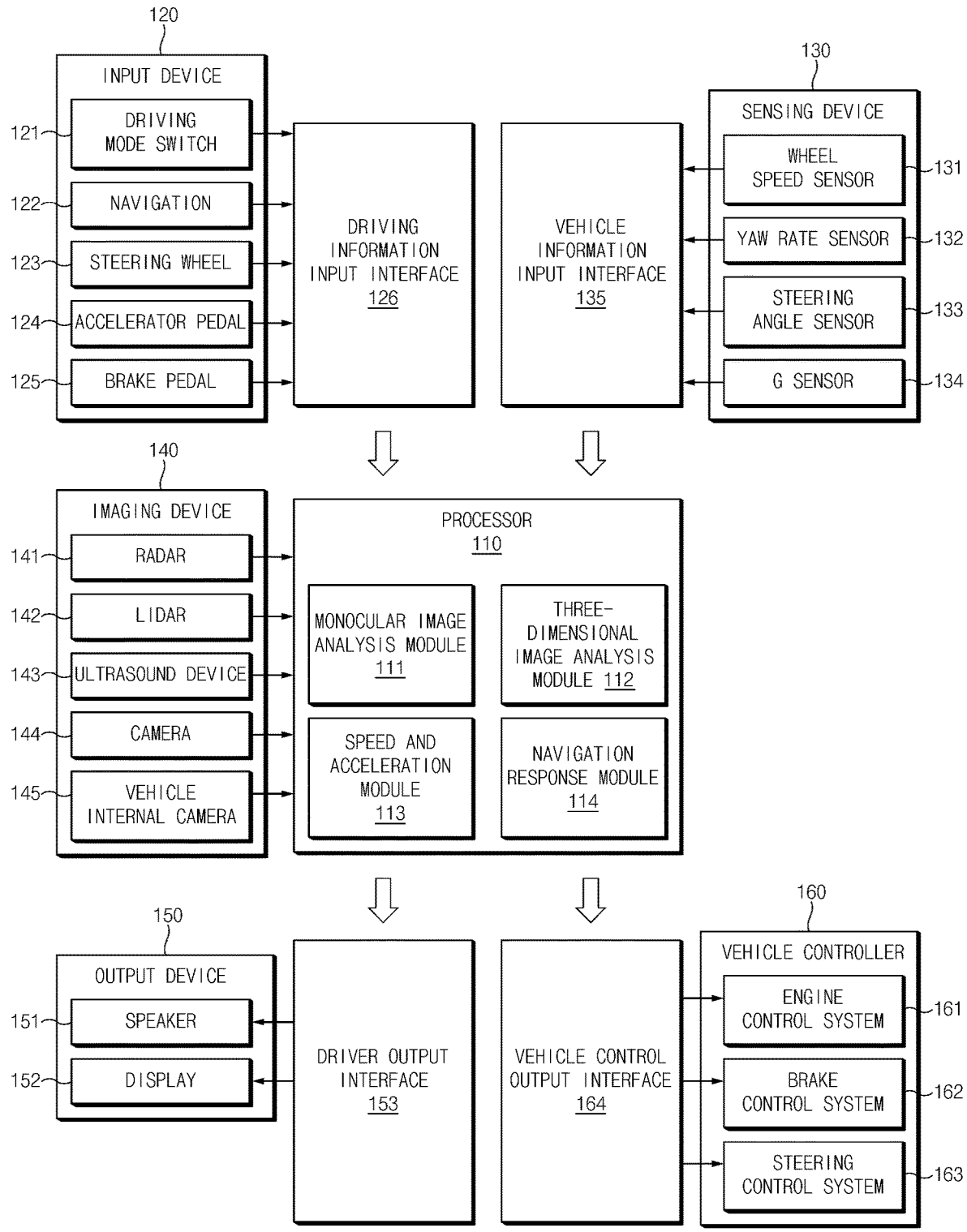
FIG. 1 is a block diagram showing a vehicle control system according to one embodiment of the present disclosure.

FIG. 1 is a block diagram showing a vehicle control system according to one embodiment of the present disclosure.

The vehicle control system according to one embodiment may include a processor 110, an input device 120, a sensing device 130, an imaging device 140, an output device 150, and a vehicle controller 160.

The processor 110 may realize autonomous driving by processing data related to driving of a vehicle. The processor 110 may include a monocular image analysis module 111, a three-dimensional image analysis module 112, a speed and acceleration module 113, and a navigation response module 114.

The monocular image analysis module 111 may analyze a monocular image of an image set acquired by the imaging device 140. The monocular image analysis module 111 may merge data included in the image set with other types of data acquired by the imaging device 140 to perform monocular image analysis. The monocular image analysis module 111 may detect, within the image set, features such as a lane marking, a vehicle, a pedestrian, a road sign, a highway interchange, a traffic light, a risk object, and other feature related to the vehicle's surroundings. The processor 110 of the vehicle control system may cause at least one navigation response such as rotation, lane change, or acceleration change of the vehicle, based on the analysis result of the monocular image analysis module 111.

The three-dimensional image analysis module 112 may combine data acquired from the imaging device 140 and data acquired from the sensing device 130 with each other and perform analysis thereon. The three-dimensional image analysis module 112 may perform three-dimensional image analysis. The three-dimensional image analysis module 112 may implement a method related to a neural network learning system, a deep neural network learning system, or a non-learning system that utilizes a computer vision algorithm to detect and/or label an object in a context of capturing and processing sensed information. The three-dimensional image analysis module 112 may employ a combination of a learning system and a non-learning system.

The speed and acceleration module 113 may control change in a speed and/or an acceleration of the vehicle. The speed and acceleration module 113 may calculate a target speed of the vehicle based on data obtained from the monocular image analysis module 111 and/or the three-dimensional image analysis module 112. The data obtained from the monocular image analysis module 111 and/or the three-dimensional image analysis module 112 may include a target position, a speed, an acceleration, the vehicle's position and/or speed with respect to a surrounding vehicle, a pedestrian or an object on a road, and position information of the vehicle for lane indication of the road. The speed and acceleration module 113 may transmit a speed control signal to the vehicle controller 160 based on the calculated target speed.

The navigation response module 114 may determine a necessary navigation response based on the data obtained from the monocular image analysis module 111, the three-dimensional image analysis module 112, and the input device 120. The data obtained from the monocular image analysis module 111, the three-dimensional image analysis module 112, and the input device 120 may include a position and a speed of the vehicle with respect to a surrounding vehicle, a pedestrian, and an object on a road, and target position information of the vehicle. The navigation response may be determined based on map data, preset vehicle position, a relative speed or a relative acceleration between the vehicle and at least one object. The navigation response module 114 may transmit a navigation control signal to the vehicle controller 160 based on a navigation response determined as being necessary. For example, the navigation response module 114 may generate the necessary navigation response by rotating the vehicle's steering handle to induce rotation by a preset angle. The navigation response determined to be necessary by the navigation response module 114 may be used as data input to the speed and acceleration module 113 to calculate a speed change of the vehicle.

The input device 120 may receive a user input for controlling a driving function. The input device 120 may include a driving mode switch 121, a navigation 122, a steering wheel 123, an accelerator pedal 124, and a brake pedal 125. The input device 120 may transmit the user input to the processor 110 through a driving information input interface 126.

The sensing device 130 may acquire data related to driving of the vehicle from the vehicle and an external environment. The sensing device 130 may include a wheel speed sensor 131, a yaw rate sensor 132, a steering angle sensor 144, and a G sensor 134. The sensing device 130 may transmit the acquired data to the processor 110 through a vehicle information input interface 135.

The imaging device 140 may detect and image an external environment. The imaging device 140 may include a radar 141, a lidar 142, an ultrasound device 143, a camera 144, and a vehicle internal camera 145. The imaging device 140 may transmit the sensed and imaged external environment to the processor 110.

The output device 150 may provide information related to driving of the vehicle to an occupant including the driver. The output device 150 may include a speaker 151 and a display 152. The output device 150 may provide information related to driving of the vehicle output from the processor 110 through a driver output interface 153 to the occupant.

The vehicle controller 160 may control driving of the vehicle. The vehicle controller 160 may include an engine control system 161, a brake control system 162, and a steering control system 163. The vehicle controller 160 may receive driving control information output from the processor 110 through a vehicle control output interface 164 to control driving of the vehicle.

Figure 2:
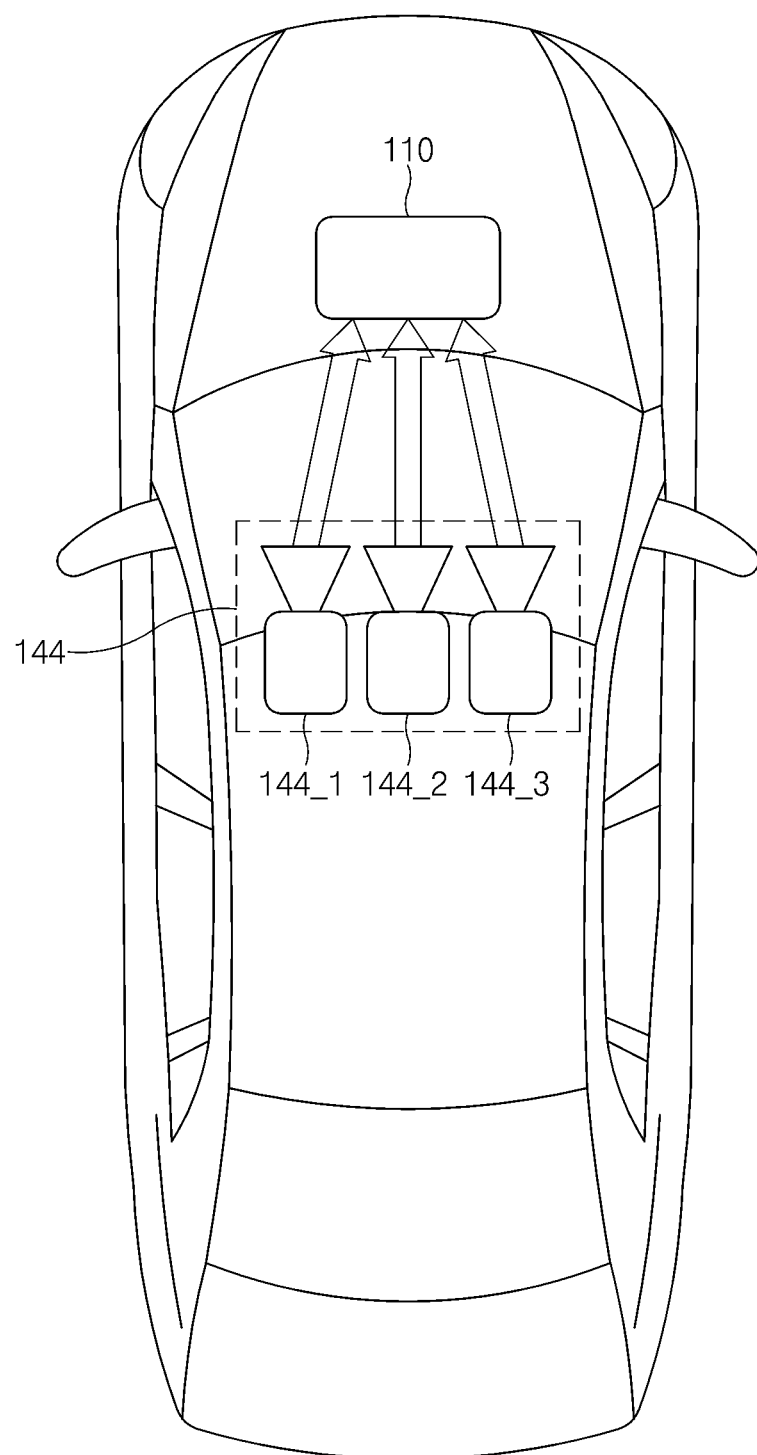
FIG. 2 is a view showing a position at which a camera of a vehicle control system according to one embodiment of the present disclosure is disposed on a vehicle.

FIG. 2 is a view showing the position in which a camera of the vehicle control system according to one embodiment of the present disclosure is disposed on the vehicle.

A camera 144 may include a first camera device 144_1, a second camera device 144_2, and a third camera device 144_3. The first camera device 144_1, the second camera device 144_2, and the third camera device 144_3 may be arranged side by side in a width direction of the vehicle. The first camera device 144_1, the second camera device 144_2, and the third camera device 144_3 may be disposed around a rear view mirror of the vehicle and/or adjacent to a driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) thereof based on differences between positions of the first camera device 144_1, the second camera device 144_2, and the third camera device 144_3. The camera 144 may transmit image data of the external environment as captured to the processor 110.

Figure 3:
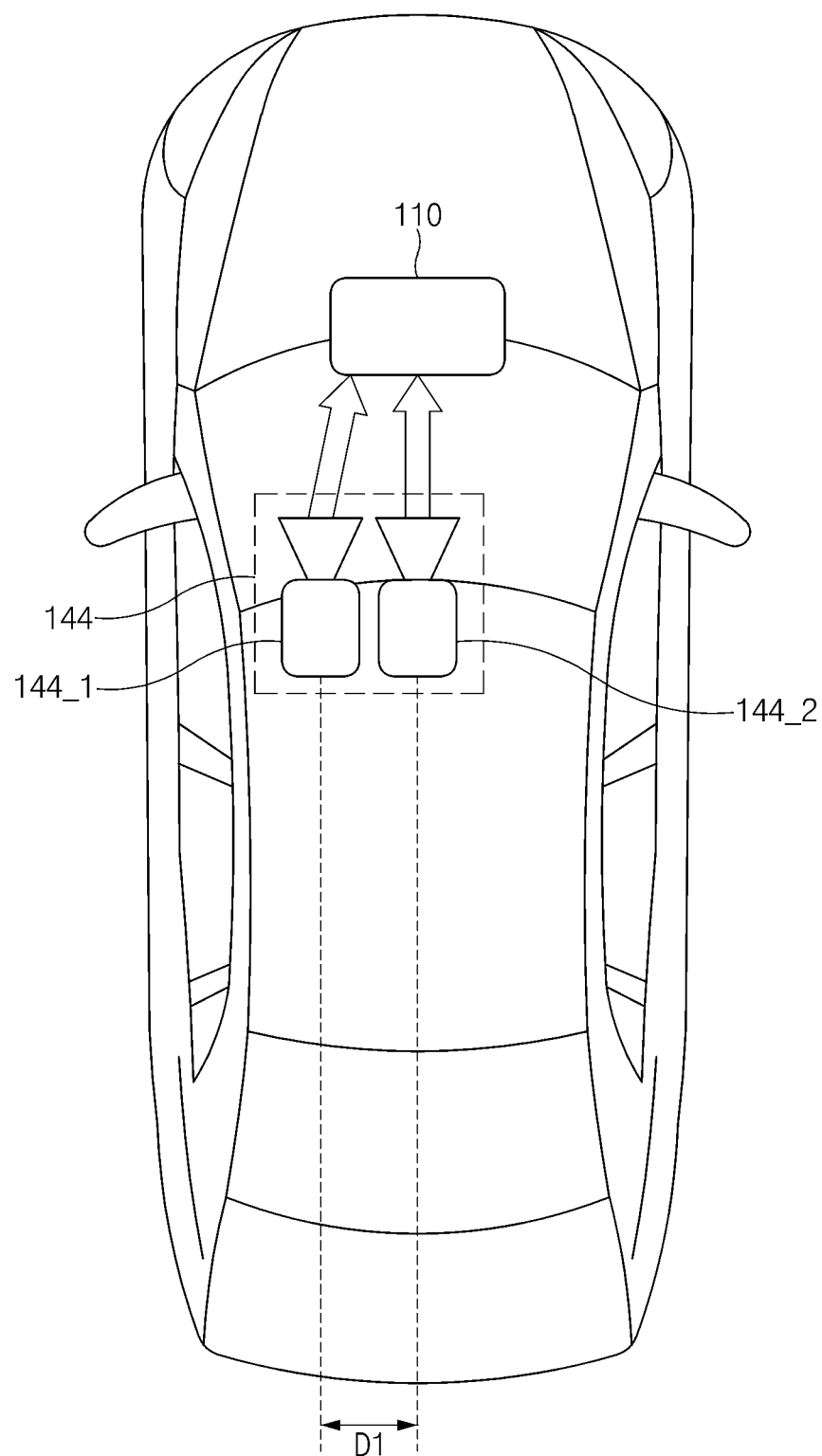
FIG. 3 is a view showing a position at which a camera of a vehicle control system according to one embodiment of the present disclosure is disposed on a vehicle.

FIG. 3 is a view showing a position in which a camera of the vehicle control system according to one embodiment of the present disclosure is disposed on the vehicle.

The camera 144 may include the first camera device 144_1 and the second camera device 144_2. The first camera device 144_1 and the second camera device 144_2 may be arranged side by side in the width direction of the vehicle. The first camera device 144_1 and the second camera device 144_2 may be arranged around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a first distance D1 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 4:
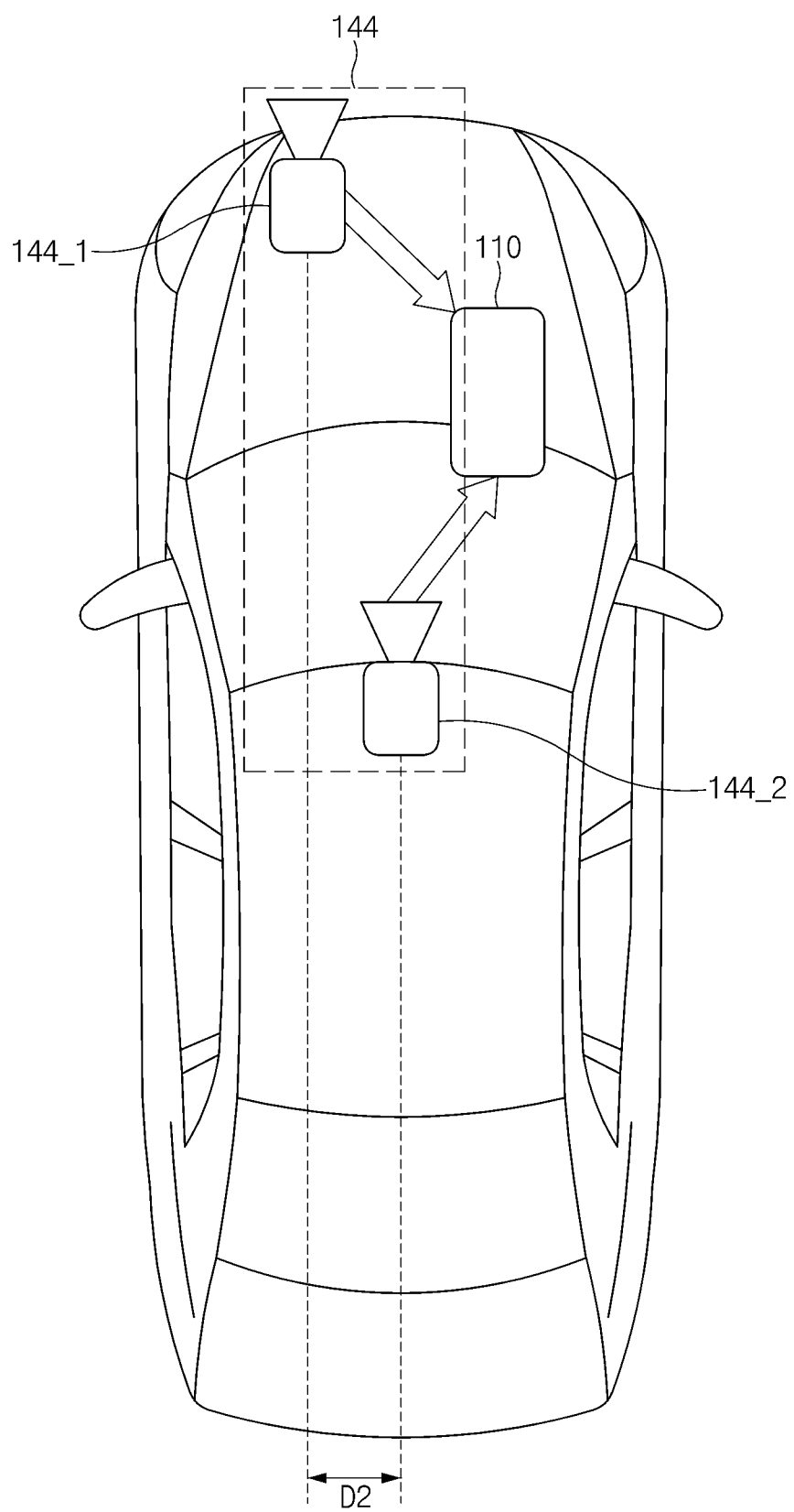
FIG. 4 is a view showing a position at which a camera of a vehicle control system according to one embodiment of the present disclosure is disposed on a vehicle.

FIG. 4 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 may be disposed above a bumper area of the vehicle or inside the bumper area. The first camera device 144_1 may be disposed adjacent to any one of corners of the bumper area. The second camera device 144_2 may be disposed around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a second distance D2 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 5:
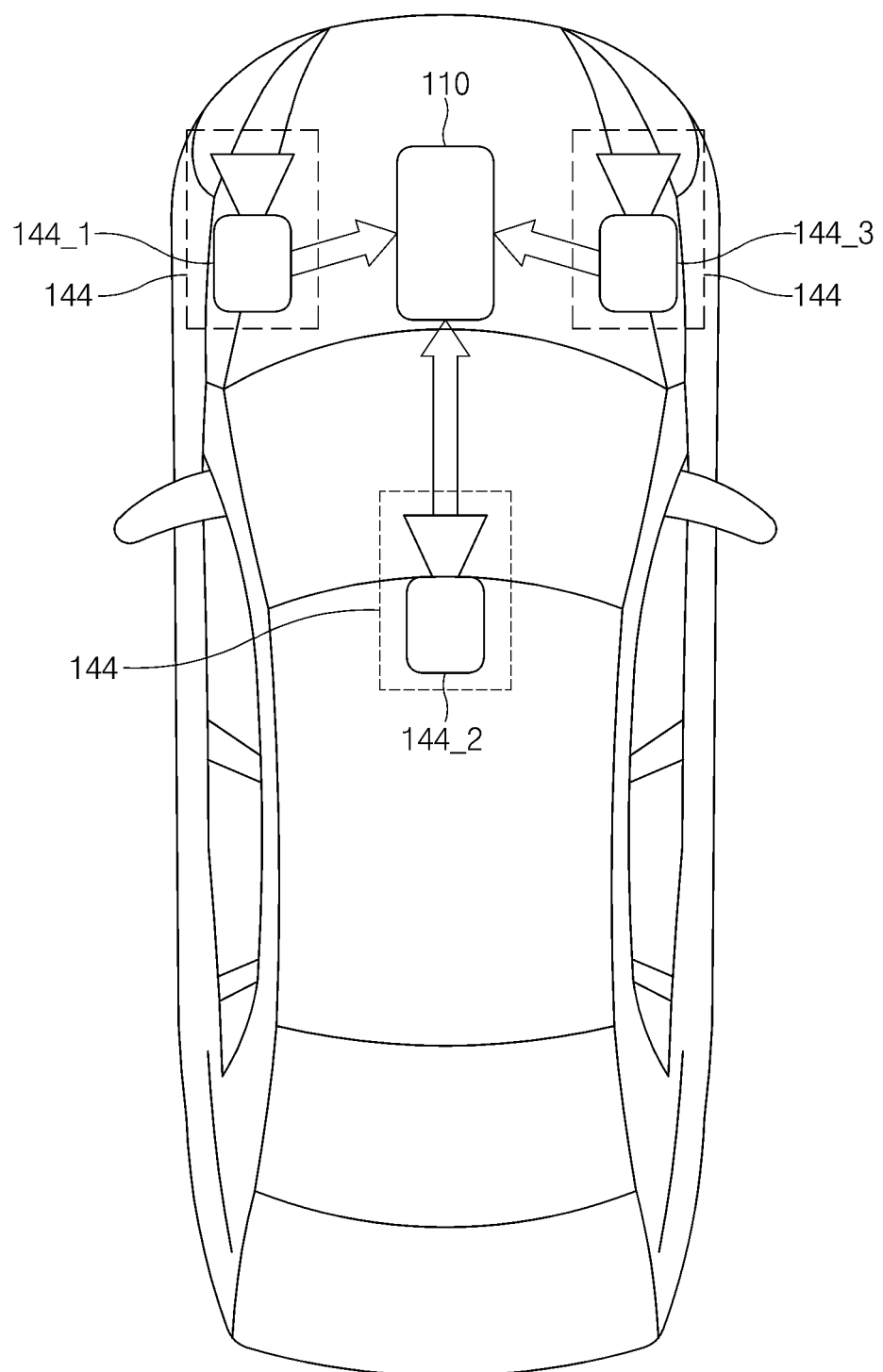
FIG. 5 is a view showing a position in which a camera of a vehicle control system according to one embodiment of the present disclosure is disposed on a vehicle.

FIG. 5 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 and the third camera device 144_3 may be disposed above or inside the bumper area of the vehicle. The first camera device 144_1 may be disposed adjacent to any one of the corners of the bumper area. The third camera device 144_3 may be disposed adjacent to a corner of the bumper area except for the corner where the first camera device 144_1 is disposed. The second camera device 144_2 may be disposed around the rear view mirror of the vehicle and/or adjacent to the driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) based on differences between positions of the first camera device 144_1, the second camera device 144_2, and the third camera device 144_3. The camera 144 may transmit the image data of the external environment as captured to the processor 110.

Figure 6:
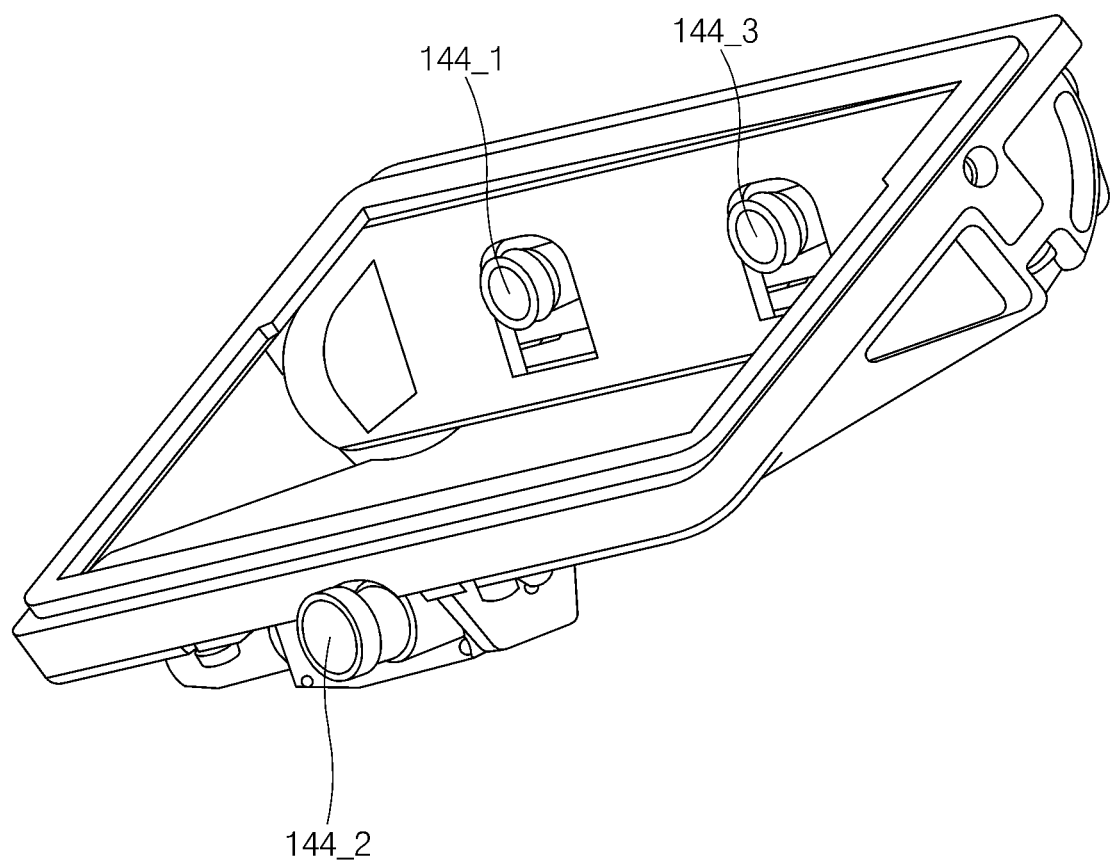
FIG. 6 is a view showing a plurality of camera devices of a vehicle control system according to one embodiment of the present disclosure.

FIG. 6 is a view showing a plurality of camera devices of the vehicle control system according to one embodiment of the present disclosure.

Figure 7:
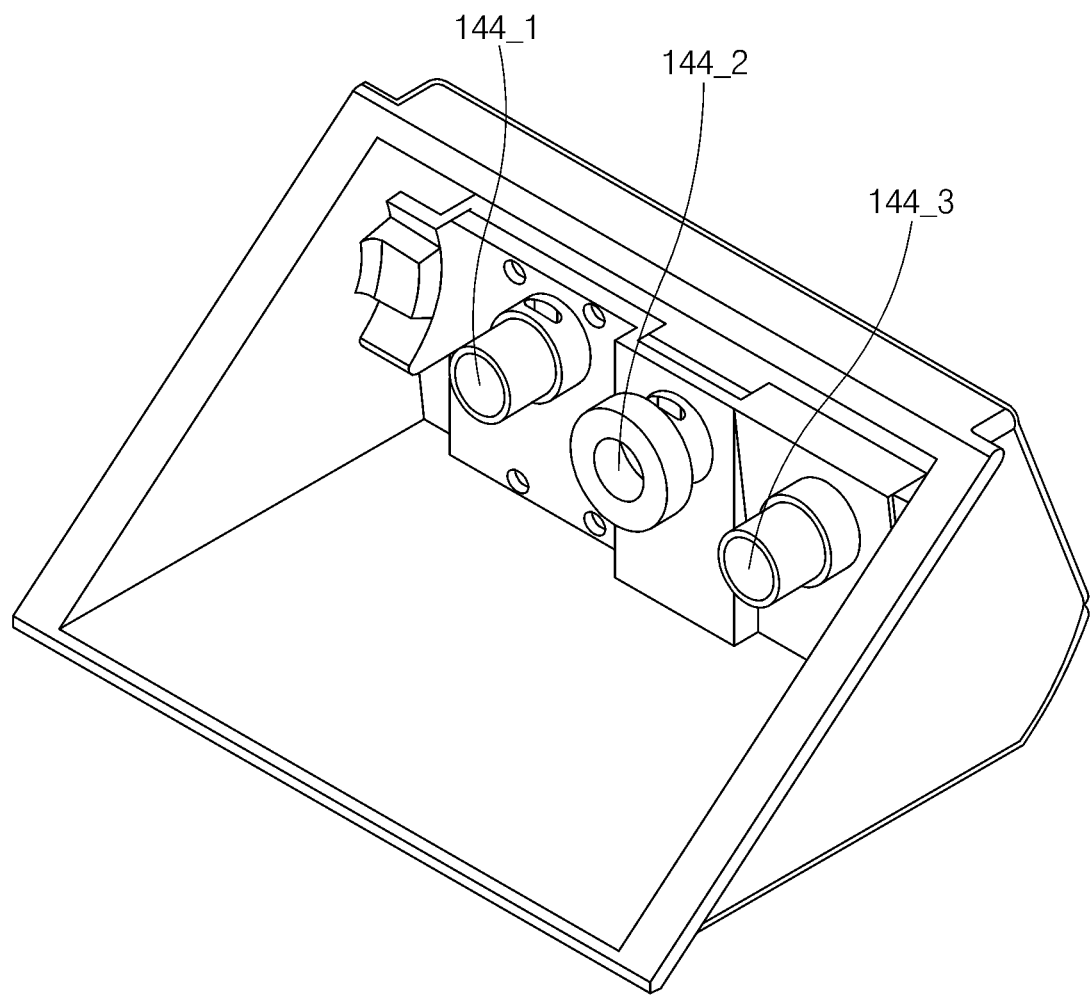
FIG. 7 is a view showing a plurality of camera devices of a vehicle control system according to one embodiment of the present disclosure.

The plurality of camera devices may include the first camera device 144_1, the second camera device 144_2, and the third camera device 144_3. FIG. 7 is a view showing a plurality of camera devices of a vehicle control system according to one embodiment of the present disclosure. The plurality of camera devices may include the first camera device 144_1, the second camera device 144_2, and the third camera device 144_3.

Each of the first camera device 144_1, the second camera device 144_2, and the third camera device 144_3 may include an image capture device of an appropriate type. The image capture device may include an optical axis. The image capture device may include an Aptina M9V024 WVGA sensor of a global shutter scheme. The image capture device may provide a resolution of 1280×960 pixels and may include a rolling shutter scheme. The image capture device may include a variety of optical elements. The image capture device may include at least one lens to provide a focal length and a field of view (FOV) required by the image capture device. The image capture device may be combined with a 6 mm lens or a 12 mm lens.

Each of the first camera device 144_1, the second camera device 144_2, and the third camera device 144_3 may have a designated field of view (FOV) angular range. Each of the first camera device 144_1, the second camera device 144_2, and the third camera device 144_3 may have a general field of view (FOV) angular range of 40 degrees or greater and 56 degrees or smaller. Each of the first camera device 144_1, the second camera device 144_2, and the third camera device 144_3 may have a narrow field of view (FOV) angular range of 23 degrees or greater and 40 degrees or smaller. Each of the first camera device 144_1, the second camera device 144_2, and the third camera device 144_3 may have a wide FOV (field of view) angular range of 100 degrees or greater and 180 degrees or smaller. Each of the first camera device 144_1, the second camera device 144_2, and the third camera device 144_3 may include a wide-angle bumper camera or a camera capable of securing up to a 180-degree field of view (FOV). The field of view (FOV) of the first camera device 144_1 may be wider, narrower, or partially overlapping than the field of view (FOV) of the second camera device 144_2.

A 7.2 megapixel image capture device with an aspect ratio of about 2:1 (e.g., H×V=3800×1900 pixels) and a horizontal field of view (FOV) of about 100 degrees may replace a configuration of a plurality of camera device composed of the first camera device 144_1, the second camera device 144_2, and the third camera device 144_3. A vertical field of view (FOV) of a megapixel image capture device using a radially symmetrical lens may be realized to be 50 degrees or smaller due to lens distortion. A radially asymmetric lens may be used to achieve a vertical field of view (FOV) of 50 degrees or greater for a horizontal field of view (FOV) of 100 degrees.

A driving support function may be provided using a multi-camera system including a plurality of camera devices. The multi-camera system may use at least one camera facing in a front direction of the vehicle. In the multi-camera system, at least one camera may face in a side direction or a rear direction of the vehicle. The multi-camera system may be configured so that the first camera device 144_1 and the second camera device 144_2 face in the front direction and/or the side direction of the vehicle using a dual-camera imaging system.

The multi-camera systems including the plurality of camera devices may employ a triple camera imaging system in which FOVs (field of view) of the first camera device 144_1, the second camera device 144_2, and the third camera device 144_3 are different from each other. The triple-camera imaging system may perform determinations based on information obtained from objects positioned at various distances in the front and side directions of the vehicle.

The first camera device 144_1 may be connected to a first image processor to perform monocular image analysis of an image provided by the first camera device 144_1. The second camera device 144_2 may be connected to a second image processor to perform monocular image analysis of an image provided by the second camera device 144_2. Information processed and output by the first and the second image processors may be combined with each other. The second image processor may receive images from both the first camera device 144_1 and the second camera device 144_2 and perform three-dimensional analysis thereon. Monocular image analysis may mean image analysis performed based on an image captured from a single field of view (e.g., an image captured by a single camera). The three-dimensional image analysis may mean image analysis performed based on two or more images captured with at least one image capture parameter (e.g., images captured respectively by at least two cameras). Captured images suitable for three-dimensional image analysis may include images captured from at least two positions, images captured from different fields of views (FOV), images captured using different focal lengths, and images captured based on parallax information.

Figure 8:
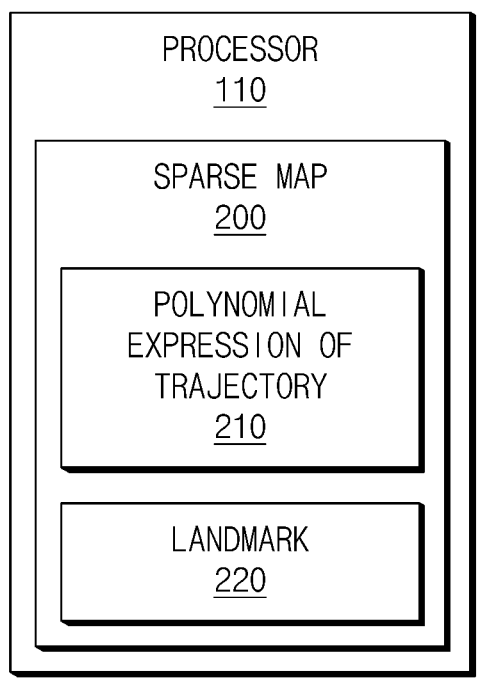
FIG. 8 is a block diagram showing a sparse map of a processor according to one embodiment of the present disclosure.

FIG. 8 is a block diagram showing a sparse map of a processor according to one embodiment of the present disclosure.

The processor 110 may include a sparse map 200. The sparse map 200 may be used for autonomous driving. The sparse map 200 may provide information for navigation of autonomous driving vehicles. The sparse map 200 and the data processed by the sparse map 200 may be stored in a memory of the vehicle control system or may be transmitted/received to/from a remote server. The sparse map 200 may store therein and use a polynomial expression of at least one trajectory along which the vehicle travels on a road. In the sparse map 200, a feature of a road section may be simplified and may be recognized as an object. The sparse map 200 may reduce an amount of data stored and transmitted/received for autonomous driving vehicle navigation. The sparse map 200 may include a polynomial expression 210 of a trajectory and a landmark 220.

The polynomial expression 210 of the trajectory may be a polynomial expression of a target trajectory for guiding autonomous driving along a road section. The target trajectory may represent an ideal route for a vehicle to travel in a road section. The road section may be expressed with at least one target trajectory. The number of target trajectories may be smaller than the number of a plurality of lines included in the road section. A vehicle operating on a road may determine navigation in consideration of a line corresponding to the target trajectory and a line offset using one of the target trajectories.

The landmark 220 may be a place or a mark associated with a specific road section or a local map. The landmark 220 may be identified and stored in the sparse map 200. A spacing between landmarks 220 may be adjusted. The landmark 220 may be used for autonomous driving navigation. The landmark 220 may be used to determine the vehicle's current position with respect to the stored target trajectory. An autonomous driving vehicle may adjust a travel direction at a current position so as to coincide with a direction of the target trajectory using the vehicle's current position information.

The landmark 220 may be used as a reference point for determining a position of the vehicle with respect to the target trajectory. While the vehicle drives based on dead reckoning in which the vehicle determine its itself-movement and estimates its position with respect to the target trajectory, the vehicle may eliminate an error in a position determination due to the dead reckoning, using a position of the landmark 220 that appears in the sparse map 200. The landmark 220 identified in the sparse map 200 may act as an anchor to allow the vehicle to accurately determine the vehicle's position with respect to the target trajectory.

Figure 9:
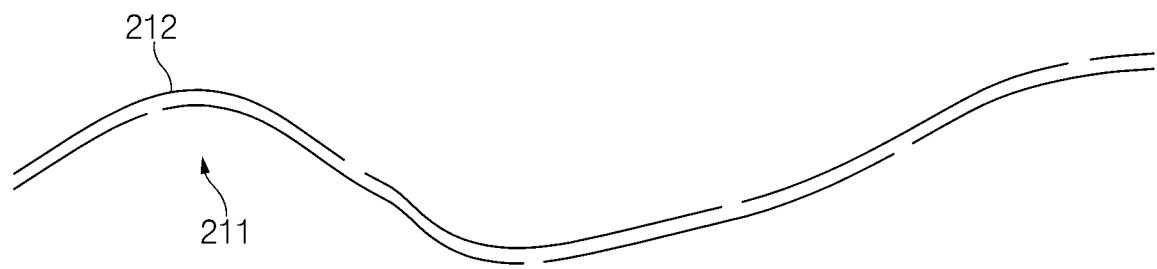
FIG. 9 is a diagram showing a polynomial expression of a trajectory according to one embodiment of the present disclosure.

FIG. 9 is a diagram showing the polynomial expression of the trajectory according to one embodiment of the present disclosure.

The sparse map may include information about a feature of a road. The sparse map may store therein a curved shape in sections 212 included in a road 211. Each of the sections 212 may have a curved shape that may be expressed as a polynomial. The road 211 may be modeled as a three-dimensional polynomial expression as a combination of the curved shapes of the lines, each line including left and right sides. A plurality of polynomials may be used to express a position and a shape of the road 211 and each of the sections 212 included in the road 211. A polynomial expressing each of the sections 212 may define a position and a shape of the section 212 within a specified distance.

Figure 10:
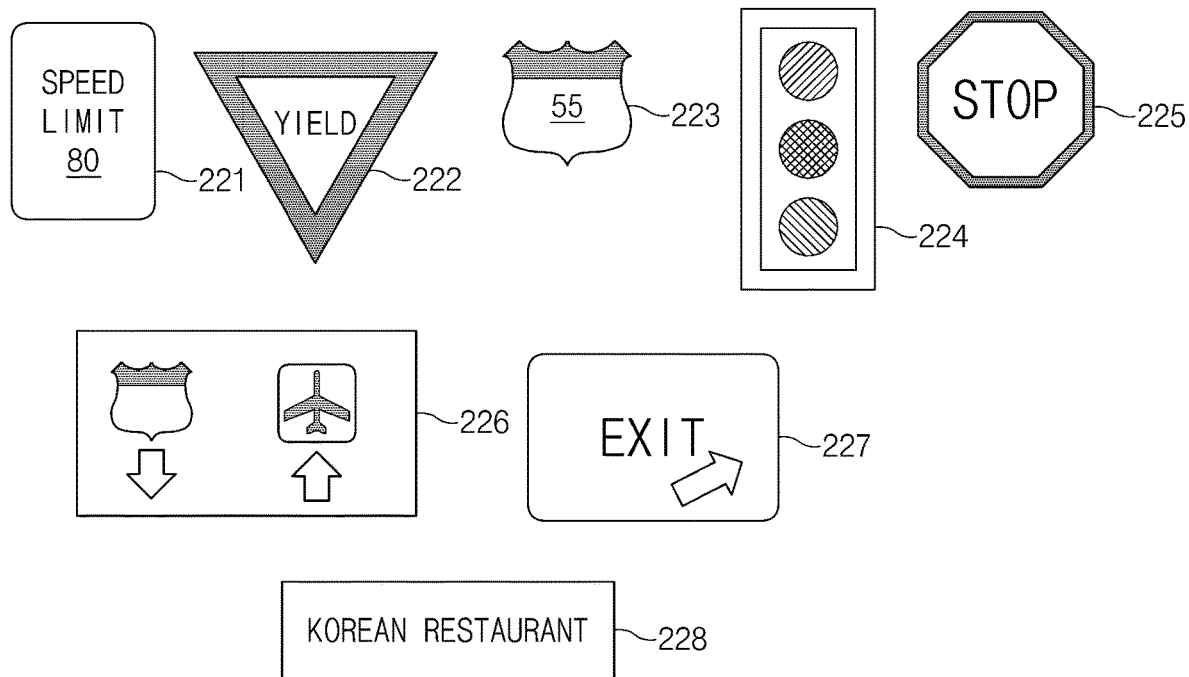
FIG. 10 is a diagram showing a landmark according to one embodiment of the present disclosure.

FIG. 10 is a diagram showing a landmark according to one embodiment of the present disclosure.

The landmarks may include a traffic sign plate, a direction indication sign plate, roadside facilities, and a general sign plate. The traffic sign plate may be a sign plate that guides traffic conditions and regulations to be observed during driving. The traffic sign plate may include a speed limit sign plate 221, a yield sign plate 222, a road number sign plate 223, a traffic signal sign plate 224, and a stop sign plate 225. The direction indication sign plate may be a sign plate with at least one arrow indicating at least one direction to another location. The direction indication sign plate may include a highway sign plate 226 with an arrow guiding the vehicle to another road or location and an exit sign plate 227 with an arrow guiding the vehicle out of the road. The general sign plate may be a sign plate that provides information related to a place. The general sign plate may include a signboard 228 of a famous restaurant in an area.

The sparse map may include a plurality of landmarks related to the road section. A simplified image of an actual image of each landmark may be stored in the sparse map. The simplified image may be composed of data depicting a feature of the landmark. The image stored in the sparse map may be expressed and recognized using a smaller amount of data than an amount of data required by the actual image. Data representing the landmark may include information to depicting or identify the landmark formed along the road.

Figure 11:
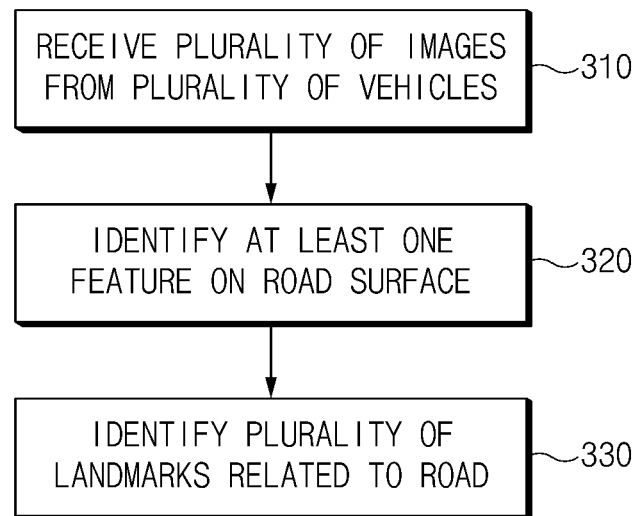
FIG. 11 is a flowchart showing a method in which a vehicle control system according to one embodiment of the present disclosure generates a sparse map.

FIG. 11 is a flowchart showing a method of generating a sparse map according to one embodiment of the present disclosure.

The vehicle control system may receive a plurality of images from a plurality of vehicles in operation 310. Each of the plurality of cameras disposed on the vehicle may image a vehicle surrounding situation which the vehicle faces while driving along the road section and thus may capture a plurality of images showing the vehicle surrounding situation. The plurality of images showing the vehicle surrounding situation may show a shape and a situation of the vehicle's travel route. The vehicle control system may receive the plurality of images captured by the plurality of cameras.

The vehicle control system may identify at least one feature on a road surface in operation 320. The vehicle control system may simplify a feature of the road surface running along the road section as a representation of at least one line, based on the plurality of images. The simplified line representation of the feature of the road surface may represent a route along the road section substantially corresponding to the road surface feature. The vehicle control system may analyze the plurality of images received from the plurality of cameras to identify an edge or a lane mark of a road. The vehicle control system may determine a driving trajectory following a road section associated with the edge of the road or the lane mark thereof. A trajectory or line representation may include a spline, a polynomial expression, or a curve. The vehicle control system may determine the vehicle's driving trajectory based on the camera's itself-movement, such as 3D translation and/or 3D rotational movement.

The vehicle control system may identify a plurality of landmarks related to the road in operation 330. The vehicle control system may analyze the plurality of images received from the camera to identify at least one landmark on the road section. The landmarks may include the traffic sign plate, the direction indication sign plate, the roadside facilities, and the general sign plate. The analysis may include a rule for admitting and rejecting a determination that the landmark may be a landmark related to a road section. The analysis may include a rule in which when a ratio of images in which the landmark appears to images in which no landmark appears exceeds a threshold value, the determination that the landmark may be a landmark related to a road section is admitted, and a rule in which when a ratio of images in which no landmark appears to images in which the landmark appears exceeds a threshold value, the determination that the landmark may be a landmark related to a road section is rejected.

Figure 12:
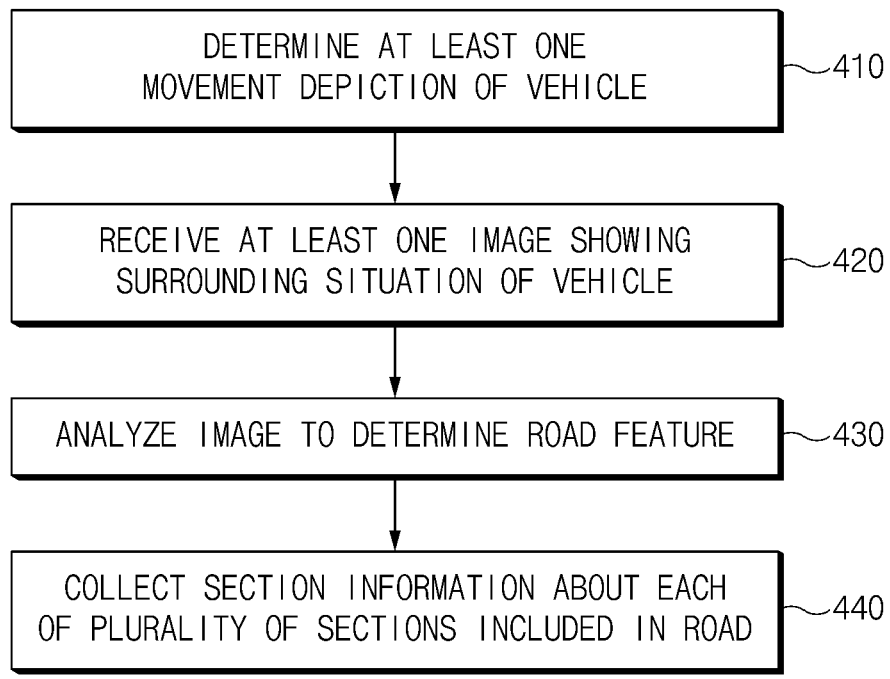
FIG. 12 is a flowchart showing a method for anonymizing navigation information by a vehicle control system according to one embodiment of the present disclosure.

FIG. 12 is a flowchart showing a method in which the vehicle control system according to one embodiment of the present disclosure anonymize navigation information.

The vehicle control system may determine at least one movement depiction of the vehicle in operation 410. The vehicle control system may determine at least one movement depiction based on an output value of the sensor. At least one movement description may include any indicator of the vehicle's movement. For example, at least one movement depiction may include an acceleration of the vehicle, a speed of the vehicle, longitudinal and transversal positions of the vehicle at a specific time, a three-dimensional position of the vehicle, and a determined trajectory of the vehicle.

At least one movement depiction may include the vehicle's itself-movement depiction in a predetermined coordinate system. The itself-movement may include rotation, translation, or movement in a transverse direction, longitudinal direction, or other directions of the vehicle. The vehicle's itself-movement may be expressed using a speed, a yaw rate, a tilt or a roll of the vehicle. A self-movement depiction of the vehicle may be determined on a given level of freedom.

The vehicle control system may receive at least one image showing the surrounding situation of the vehicle in operation 420. The vehicle control system may receive, from the camera, an image of the road on which the vehicle is driving and an image of a surrounding around the vehicle.

The vehicle control system may analyze the image to determine a road feature in operation 430. The vehicle control system may analyze at least one image according to a command stored in the image analysis module, or utilize a learning system such as a neural network to determine at least one road feature. At least one road feature may include a road feature such as a median line of the road, an edge of the road, a landmark along the road, a pothole on the road, a turn of the road, or the like. At least one road feature may include a lane feature including an indicator indicating at least one of lane separation, lane merging, dashed-line lane indication, solid-line lane indication, a road surface color in a lane, a line color, a lane direction, or a lane type regarding a lane as detected. The lane feature may include a determination that the lane is a HOV (High-Occupancy Vehicles) lane and a determination that the lane is separated from another lane by a solid line. At least one road feature may include an indicator of a road edge. The road edge may be determined based on a detected barrier along the road edge, a detected sidewalk, a line indicating an edge, a road boundary stone along the road edge, or based on detection of an object along the road.

The vehicle control system may collect section information about each of a plurality of sections included in the road in operation 440. The vehicle control system may divide the road into the plurality of sections. The vehicle control system may combine each of the plurality of sections with the road feature to collect the section information about each of the plurality of sections. The section information may include at least one movement depiction of the vehicle and/or at least one road feature relative to the section of the road. The vehicle control system may collect the section information including the movement depiction calculated in operation 410 and the road feature determined in operation 430.

Figure 13:
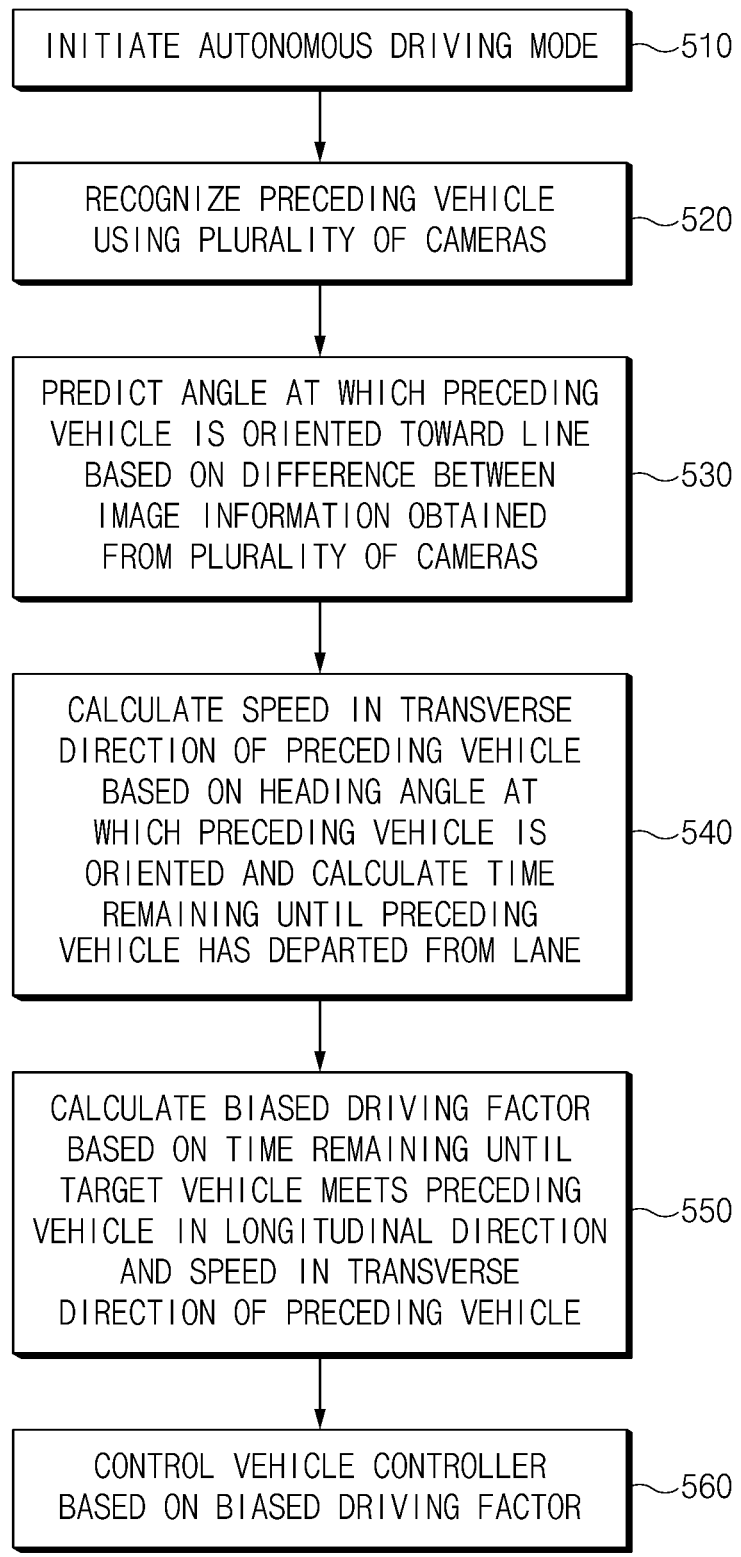
FIG. 13 is a flowchart showing a method in which a vehicle control system according to one embodiment of the present disclosure adjusts a control target point for a cut-in vehicle based on a camera position.

FIG. 13 is a flowchart showing a method in which the vehicle control system according to one embodiment of the present disclosure adjusts a control target point for a cut-in vehicle according to a camera position.

The vehicle control system may initiate the autonomous driving mode in operation 510. In order to lower a risk of an accident in the autonomous driving mode, it may be important to quickly determine whether a preceding vehicle cuts-in in front of the vehicle. When the control target point is adjusted according to the cut-in, the stability of autonomous driving may be secured.

The vehicle control system may recognize the preceding vehicle using a plurality of cameras in operation 520. The plurality of cameras may be included in the vehicle's imaging device. The plurality of cameras may be mounted in different positions of the vehicle. The vehicle control system may recognize the preceding vehicle using each of the plurality of cameras mounted in different positions.

The vehicle control system may predict an angle at which the preceding vehicle is oriented toward a line based on a difference between image information obtained from the plurality of cameras in operation 530. The difference between image information recognized by the plurality of cameras mounted at different positions may occur. The vehicle control system may calculate a heading angle as an angle defined between the preceding vehicle and the vehicle based on the difference between the image information.

The vehicle control system may calculate a speed in the transverse direction of the preceding vehicle based on the heading angle at which the preceding vehicle is oriented and calculate a time remaining until the preceding vehicle has departed from a lane in operation 540. The time remaining until the preceding vehicle has departed from the lane may be referred to as TTLC (Time to lane crossing). The vehicle control system may calculate the speed in the transverse direction of the preceding vehicle using the calculated heading angle. The vehicle control system may calculate a time remaining until the preceding vehicle has departed from the lane and invades the lane of the vehicle using the calculated speed in the transverse direction of the preceding vehicle.

The vehicle control system may calculate a biased driving factor based on a time remaining until the vehicle meets the preceding vehicle in the longitudinal direction and the speed in the transverse direction of the preceding vehicle in operation 550. The time remaining until the preceding vehicle meets the vehicle in the longitudinal direction may be referred to as TTC (Time to crashing). The vehicle control system may calculate the biased driving factor as a value obtained by dividing the time remaining until the preceding vehicle meets the vehicle in the longitudinal direction by the speed in the transverse direction of the preceding vehicle.

The vehicle control system may control the vehicle controller based on the biased driving factor in operation 560. The vehicle control system may initiate bias control of the vehicle controller such that the vehicle is biased toward the opposite line according to the biased driving factor. The vehicle control system may initiate variable biased driving control according to the biased driving factor. The vehicle control system may determine whether the preceding vehicle cuts-in in front of the vehicle and control the vehicle to drive in a biased manner so as to be far away from the preceding vehicle that cuts-in into a control point in the transverse direction, thereby improving the stability of autonomous driving.

The vehicle control system according to the present disclosure may improve accuracy of a travel route on which the vehicle is to drive.

In addition, various effects directly or indirectly identified via the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control system comprising:
a processor configured to process data related to driving of a vehicle;
an imaging device configured to sense and image an external environment; and
a vehicle controller configured to control the driving of the vehicle, wherein the processor is configured to:
recognize a preceding vehicle using a plurality of cameras included in the imaging device;
predict an angle at which the preceding vehicle is oriented toward a subject line based on a difference between image information obtained from the plurality of cameras;
calculate a speed of the preceding vehicle in a transverse direction based on the angle;
calculate a biased driving factor based on a time remaining until the vehicle meets the preceding vehicle in a longitudinal direction and the speed of the preceding vehicle in the transverse direction; and
control the vehicle controller based on the biased driving factor.

2. The system of claim 1, wherein the system further comprises:
an input device configured to receive a user input for controlling a driving function of the vehicle;
a sensing device configured to acquire the data related to driving of the vehicle from the vehicle and the external environment; and
an output device configured to provide information related to the driving of the vehicle.

3. The system of claim 1, wherein the processor is configured to initiate biased driving control of the vehicle controller such that the vehicle drives in a biased manner toward a line opposite to the subject line, based on the biased driving factor.

4. The system of claim 1, wherein the processor is configured to calculate a heading angle between the preceding vehicle and the vehicle, based on the difference between the image information obtained from the plurality of cameras.

5. The system of claim 1, wherein the processor is configured to calculate the biased driving factor by dividing the time remaining until the vehicle meets the preceding vehicle in the longitudinal direction by the speed of the preceding vehicle in the transverse direction.

6. The system of claim 1, wherein the processor is configured to determine whether the preceding vehicle cuts-in in front of the vehicle and to control the vehicle controller such that the vehicle drives in a biased manner to a side opposite to the preceding vehicle invading a control point in the transverse direction.

7. The system of claim 1, wherein each of the cameras is mounted at a different position of the vehicle.

8. A method for driving a vehicle using a vehicle control system, the method comprising:
recognizing a preceding vehicle using a plurality of cameras included in an imaging device of the vehicle;
predicting an angle at which the preceding vehicle is oriented toward a subject line based on a difference between image information obtained from the plurality of cameras;
calculating a speed of the preceding vehicle in a transverse direction based on the angle;
calculating a biased driving factor based on a time remaining until the vehicle meets the preceding vehicle in a longitudinal direction and the speed of the preceding vehicle in the transverse direction; and
controlling a vehicle controller based on the biased driving factor.

9. The method of claim 8, wherein controlling the vehicle controller includes initiating biased driving control of the vehicle controller such that the vehicle drives in a biased manner toward a line opposite to the subject line, based on the biased driving factor.

10. The method of claim 8, wherein predicting the angle at which the preceding vehicle is oriented toward the subject line includes calculating a heading angle between the preceding vehicle and the vehicle, based on the difference between the image information obtained from the plurality of cameras.

11. The method of claim 8, wherein calculating the biased driving factor includes dividing the time remaining until the vehicle meets the preceding vehicle in the longitudinal direction by the speed of the preceding vehicle in the transverse direction.

12. The method of claim 8, wherein controlling the vehicle controller includes:
determining whether the preceding vehicle cuts-in in front of the vehicle; and
controlling the vehicle controller such that the vehicle drives in a biased manner to a side opposite to the preceding vehicle invading a control point in the transverse direction.

* * * * *